W. W. Atteberry.
Plow Clevis.
Nº 93,396. Patented Aug. 10, 1869.

Witnesses.
Alex T. Roberts
Jno. K. Brooks

Inventor.
W. W. Atteberry
per Munn & Co.
Attys.

UNITED STATES PATENT OFFICE.

WILLIAM W. ATTEBERRY, OF CHESTERFIELD, ILLINOIS.

IMPROVEMENT IN CLEVISES.

Specification forming part of Letters Patent No. 93,396, dated August 10, 1869.

*To all whom it may concern:*

Be it known that I, W. W. ATTEBERRY, of Chesterfield, in the county of Macoupin and State of Illinois, have invented a new and Improved Plow-Clevis; and I do hereby declare that the following is a full, clear, and exact description thereof, which will enable others skilled in the art to make and use the same, reference being had to the accompanying drawings, forming part of this specification, in which—

Figure 1:
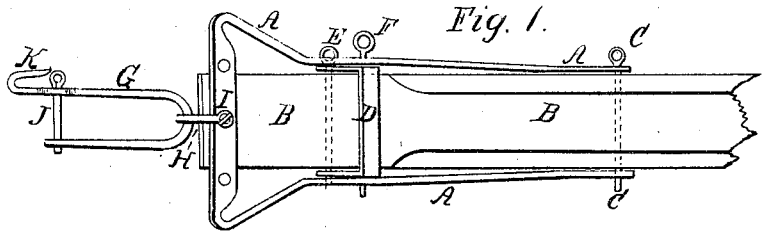
Figure 2:
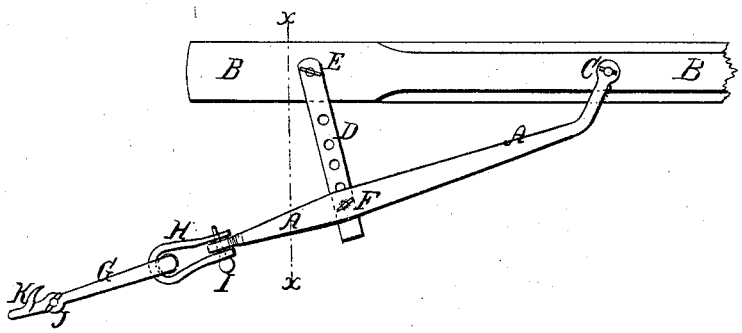
Figure 3:
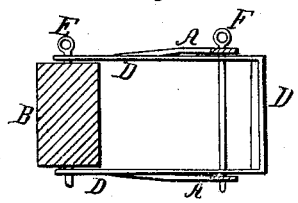

Figure 1 is a side view of my improved clevis as attached to a plow-beam. Fig. 2 is a top view of the same. Fig. 3 is a sectional view of the same, taken through the line $x$ $x$, Fig. 2.

Similar letters of reference indicate corresponding parts.

My invention has for its object to furnish an improved adjustable clevis for attaching two or more horses to a plow, and which shall be so constructed and arranged that it may be readily adjusted to cause the plow to cut a wide or narrow furrow, as may be desired; and it consists in the construction and combination of the various parts of the clevis, as hereinafter more fully described.

A represents the main part or clevis, the ends of the arms of which are bent to one side, and are secured to the plow-beam B by a wrench-bolt or clevis-pin, C.

D is a gage, which is made somewhat in the form of a clevis, and the ends of the arms of which are adjustably attached to the plow-beam B by a pin or bolt, E, passing through the said beam and through one or the other of the holes through the arms of the said gage. The clevis A is connected with the gage D by a pin or bolt, F, which passes through the arms of the clevis A and through one or the other of the holes through the said gage D, as shown in Figs. 1, 2, and 3.

G is the double-tree clevis, which is connected to the clevis A by the small clevis H, the pin I of which passes through one or the other of the holes in the forward part of the clevis A, according to the depth at which it is desired to have the plow run in the ground.

J is the clevis-pin by means of which the double-tree is connected with the clevis G. Upon the forward end of the upper arm of the clevis G is formed a hook, K, for the attachment of the third or middle horse when three horses are used.

Having thus described my invention, I claim as new and desire to secure by Letters Patent—

An improved plow-clevis, formed by the combination of the main clevis A, adjusting-gage D, double-tree clevis G, having a hook, K, formed upon the forward end of its upper arm, and connecting-clevis H, with each other, said parts being constructed and arranged substantially as herein shown and described, and for the purpose set forth.

The above specification of my invention signed by me this 9th day of June, 1869.

WILLIAM W. ATTEBERRY.

Witnesses:
WILLIAM P. OLIVER,
GIDEON W. DRAKE.